April 1, 1941.  A. BRILL  2,237,173
CONVEYER BELT

Filed Oct. 26, 1939

INVENTOR
Abraham Brill
BY
Willard D. Eakin
ATTORNEY

UNITED STATES PATENT OFFICE 2,237,173

CONVEYER BELT

Abraham Brill, Youngstown, Ohio, assignor to Lee Rubber and Tire Corporation, Conshohocken, Pa., a corporation of New York Application October 26, 1939, Serial No. 301,331

4 Claims. (Cl. 198—193)

This invention relates to conveyer belts.

Its chief objects are to provide a conveyer belt adapted to have long life in service and to do this without excessive expense.

More specific objects are to provide a belt adapted to sustain without quick deterioration the impact of heavy materials, such as coal, ore, crushed stone, or the like, dropped or poured onto the belt, and to do this by providing for effective cushioning of the impact in conjunction with the use of an effective abrasion resisting and cut-resisting material for the load-receiving surface layer of the belt.

Such belts ordinarily consist of a belt-body composed of rubberized fabric or cord, a load-receiving surface layer of highly pigmented, abrasion-resisting rubber, and, between the two, a layer of open-mesh "breaker" fabric for distributing the force of the material that is to be conveyed as it falls upon the belt.

As the abrasion-resisting surface is necessarily of a rather hard composition, it is not very effective as a cushioning element, and the same is true of the fabric-and-rubber or cord-and-rubber belt body, as the layers of reinforcing fabric or cord are separated by only very thin films of rubber in order that the belt shall not have such thickness as to make it excessively stiff for troughing or for flexing as it passes around the end rolls.

Also, even though relatively soft rubber be used for rubberizing the "breaker," the latter, so far as I am aware, has always had only such a thin layer of such rubber between it and the hard wear-surface layer and between it and the hard belt body that its force distributing effect has been inadequate, the three elements being so close together that the entire force of the impact of a lump of coal, for example, has been transmitted to the belt body in a closely localized area instead of being distributed obliquely to the belt body as contemplated in the employment of the breaker layer.

I attain the above stated objects by providing in the vicinity of my breaker fabric, and preferably between it and the belt body, a layer of relatively soft, low-pigment, cushioning rubber or the like, which is sufficiently thick to act effectively as a cushioning element, and to provide proper oblique or lateral distribution of the shock of impact by the breaker layer.

If a thin layer of soft cushioning rubber be laid upon an anvil and hit with a hammer it is likely to be ruptured because of the smallness of the time element involved in the sustaining of the impact. Stated another way, the entire kinetic energy of the falling object has to be absorbed by work done in the distortion of the belt with the force of impact operating through only a small distance, which means that the force in pounds is relatively great, upon the principle that the amount of work done (energy absorbed in work) is equal to the force times the distance through which it acts.

By providing a cushion layer such as to make this distance greater, the maximum force in pounds is correspondingly reduced.

There is a rather definite, critical thickness for a highly effective cushioning layer, depending upon the weight of the falling particles, the distance through which they fall, and the modulus of elasticity and the rupture point of the belt materials used, and of course the sharpness of the particle or the relative area thereof contacting the belt. In large fabric-reinforced rubber belts such as are commonly sold for heavy duty, for example, I find that a cushion layer about 1/8" or more in thickness is pronouncedly more effective in the usual service than a cushion layer substantially less than 1/8" in thickness, while in belts for lighter service the critical thickness is about 1/16".

The cushioning layer can be incorporated in the belt in several forms, some of which are illustrated in the accompanying drawing, of which:

Figure 1:
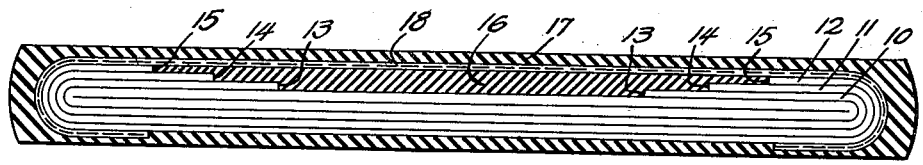
Fig. 1 is a cross-section of a conveyer belt embodying my invention in its preferred form.

The invention is of especial value in stepped-ply belts, as illustrated in Fig. 1, in which some of the outer plies of body fabric, like the three outer plies 10, 11 and 12 in this figure, terminate, on the load-receiving side of the belt, in longitudinally disposed fabric edges, as at 13, 13, 14, 14, and 15, 15, leaving a trough-like space or valley between the two sets of fabric edges requiring to be filled with rubber, or the like.

For filling this space I use a relatively soft, live, springy stock 16, such as low pigmented rubber, and thus obtain the advantages of my invention without greater or substantially greater labor cost than has been involved in the construction of stepped-ply belts as heretofore made and, while the cushion stock is a little more expensive than the highly pigmented tread stock 17, the amount of cushion stock required in this embodiment is not very great, because it is restricted to the medial, load-receiving zone of the belt, where it is most needed.

The layer of breaker fabric above referred to is shown at 18, and preferably it is rubberized with a friction coat or coats, and permissibly with a skim coat or coats, of the cushion stock. The advantage of employing the cushion stock as described perhaps can be further elucidated by contemplation of the fact that the cords of the breaker fabric have a substantial amount of "give" and consequently cannot be put under very much tension, so as to perform their function, unless there is sufficient cushion stock between them and the belt body to allow them to be forced out of their normal position, locally, by the impact of the falling object.

On the other hand, when there is sufficient cushion stock, so placed, it yields sufficiently to permit the breaker fabric to be locally depressed and thus be brought into play as a force distributing and cushioning factor, acting somewhat in the manner of a life-net into which persons safely jump from a burning building, for example, the life-net, or the breaker fabric, acting with a graduated, increasing, mechanical advantage in stopping the falling object.

Figure 2:
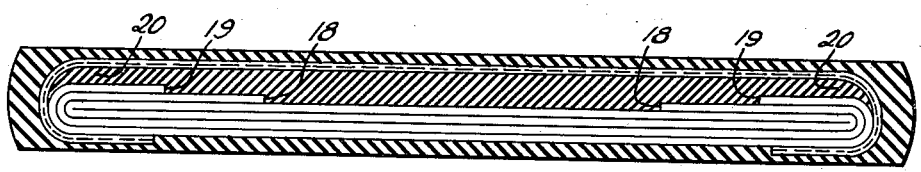
Figs. 2, 3 and 4 are similar sections illustrating other embodiments.

Fig. 2 illustrates a similar belt in which only two of the outer body plies are stepped, at 18, 18 and 19, 19, and cushion stock addition to that required for filling in between the steps is employed, this additional stock being extended as a layer, 20, 20, upon each of the folded-over margins of the outer ply of body fabric.

Figure 3:
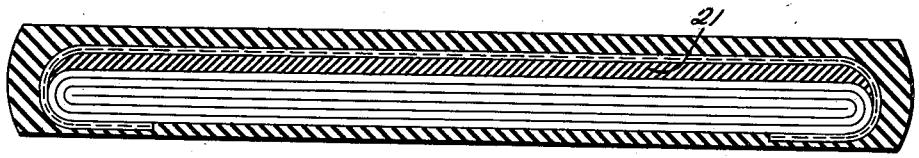

In Fig. 3 is shown a belt which is not of the stepped-ply type but in which a thick layer of cushion stock 21 is placed between the breaker and the body of the belt.

Figure 4:
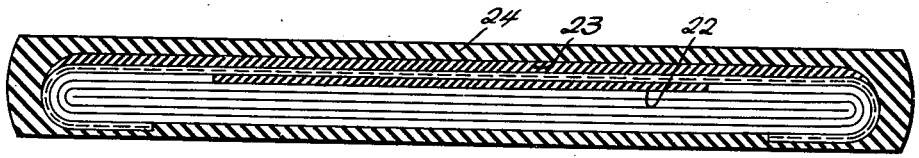

In Fig. 4 cushion stock 22 is placed between the breaker and the body of the belt and cushion stock 23 is placed between the breaker and the load-receiving stock 24, the breaker also preferably being rubberized with the cushion stock.

In these and other embodiments the advantages set forth in the above statement of objects can readily and inexpensively be obtained and other modifications are possible without sacrifice of all of such advantages.

I claim:

1. A conveyer belt comprising a belt body of the stepped-ply type and, substantially filling the valley incident to the stepped-ply construction, a cushioning element composed of dense material having substantially the resilient deformability of vulcanized low-pigment soft rubber, and a relatively hard layer of abrasion resisting material overlying said cushioning element and firmly united therewith.

2. A conveyer belt comprising a belt body of the stepped-ply type and, substantially filling only the valley incident to the stepped-ply construction, a cushioning element composed of material having substantially the resilient deformability of vulcanized low-pigment soft rubber, and a relatively hard layer of abrasion resisting material overlying said cushioning element and firmly united therewith.

3. A conveyer belt comprising a reinforced belt body, a layer of relatively hard abrasion-resisting material on the load-receiving side of said belt body, and, between the two, a breaker layer and, on each face thereof, a soft layer of cushioning material having substantially the resilient deformability of vulcanized, low-pigment soft rubber and of such thickness as to provide substantial cushioning of the impact of the material to be conveyed.

4. A conveyer belt comprising a belt body, a wear surface layer, a breaker layer between them comprising reinforcing elements having appreciable stretchability and, between the breaker layer and the belt body, a layer of cushioning material softer than the wear surface layer and having sufficient resilient deformability and sufficient thickness to permit the reinforcing elements to bring a substantial part of their resistance strength into effect by being forced out of their normal plane locally and thus put under substantial tension.

ABRAHAM BRILL.